US012091897B2

(12) United States Patent
Duer

(10) Patent No.: US 12,091,897 B2
(45) Date of Patent: Sep. 17, 2024

(54) GUIDE SYSTEM FOR GUIDING AT LEAST ONE DOOR LEAF

(71) Applicant: Julius Blum GmbH, Hoechst (AT)

(72) Inventor: Stefan Duer, Schwarzach (AT)

(73) Assignee: JULIUS BLUM GMBH, Hoechst (AT)

( * ) Notice: Subject to any disclaimer, the term of this patent is extended or adjusted under 35 U.S.C. 154(b) by 385 days.

(21) Appl. No.: 17/527,698

(22) Filed: Nov. 16, 2021

(65) Prior Publication Data

US 2022/0074250 A1 Mar. 10, 2022

Related U.S. Application Data

(63) Continuation of application No. PCT/AT2020/060179, filed on May 4, 2020.

(30) Foreign Application Priority Data

May 17, 2019 (AT) .............................. A 50451/2019

(51) Int. Cl.
*E05D 15/58* (2006.01)
*E05D 15/26* (2006.01)

(52) U.S. Cl.
CPC ........... *E05D 15/58* (2013.01); *E05D 15/264* (2013.01); *E05Y 2201/684* (2013.01);
(Continued)

(58) Field of Classification Search
CPC . E05D 15/58; E05D 15/264; E05Y 2201/684; E05Y 2201/692; E05Y 2800/102; E05Y 2900/212
See application file for complete search history.

(56) References Cited

U.S. PATENT DOCUMENTS 5,131,449 A 7/1992 Winn et al.
9,068,386 B2 6/2015 Ishii et al.
(Continued)

FOREIGN PATENT DOCUMENTS

CN 103375100 10/2013
CN 104080992 3/2016
(Continued)

OTHER PUBLICATIONS

English language translation of Search Report issued Aug. 24, 2022 in corresponding Chinese Patent Application No. 202080036841.1.
(Continued)

*Primary Examiner* — Daniel J Rohrhoff
(74) *Attorney, Agent, or Firm* — Wenderoth, Lind & Ponack, L.L.P.

(57) ABSTRACT

A guide system for guiding at least one door wing, in particular a folding-sliding-door, relative to a furniture carcass includes a first guide configured to guide the at least one door wing along a front face of the furniture carcass, and at least one second guide extending transversely to the first guide. The at least one second guide is configured to guide the at least one door wing along a sidewall of the furniture carcass, and the guide system includes at least one deflection element for supporting the at least one door wing at least in a transition region between the first and second guide. By the at least one deflection element, a collision between the furniture carcass, in particular the sidewall of the furniture carcass, and/or a cover arranged thereon and the at least one door wing can be prevented in the transition region.

18 Claims, 7 Drawing Sheets

(52) U.S. Cl.
CPC ... *E05Y 2201/692* (2013.01); *E05Y 2800/102* (2013.01); *E05Y 2900/212* (2013.01)

(56) References Cited

U.S. PATENT DOCUMENTS

| | | | | |
|---|---|---|---|---|
| 9,500,019 | B2 | 11/2016 | Haab et al. | |
| 10,400,493 | B2 | 9/2019 | Gabl | |
| 10,753,133 | B2 | 8/2020 | Kohlweiss | |
| 2007/0144687 | A1 | 6/2007 | Griebel | |
| 2013/0276373 | A1 | 10/2013 | Haab et al. | |
| 2015/0008811 | A1* | 1/2015 | Ishii | E06B 3/5045 312/322 |
| 2015/0300075 | A1 | 10/2015 | Lyons | |
| 2017/0260789 | A1* | 9/2017 | Gabl | E06B 3/509 |
| 2018/0119470 | A1 | 5/2018 | Kohlweiss | |
| 2019/0284859 | A1 | 9/2019 | Rupp et al. | |
| 2019/0330898 | A1 | 10/2019 | Rupp et al. | |
| 2020/0018108 | A1 | 1/2020 | Sperger et al. | |
| 2020/0157867 | A1* | 5/2020 | Girotto | E05D 15/58 |
| 2021/0262260 | A1* | 8/2021 | Duer | E05D 15/264 |
| 2022/0056744 | A1* | 2/2022 | Duer | E05D 15/58 |
| 2022/0307302 | A1* | 9/2022 | Folie | E05D 11/0054 |

FOREIGN PATENT DOCUMENTS

| | | |
|---|---|---|
| CN | 108071288 | 5/2018 |
| EP | 0 433 726 | 6/1991 |
| JP | 6-37480 | 5/1994 |
| JP | 7-52308 | 11/1995 |
| JP | 2915965 | 7/1999 |
| JP | 2010-47923 | 3/2010 |
| JP | 2018-500483 | 1/2018 |
| TW | I647375 | 1/2019 |
| WO | 2016/081963 | 6/2016 |
| WO | 2018/129572 | 7/2018 |
| WO | 2018/204947 | 11/2018 |

OTHER PUBLICATIONS

International Search Report issued Jul. 27, 2020 in International (PCT) Application No. PCT/AT2020/060179.

* cited by examiner

GUIDE SYSTEM FOR GUIDING AT LEAST ONE DOOR LEAF

BACKGROUND OF THE INVENTION

The present invention relates to a guide system for guiding a door wing, in particular a folding-sliding-door, relative to a furniture carcass. The guide system includes a first guide configured to guide the door wing along a front face of the furniture carcass, and a second guide extending transversely to the first guide. The second guide is configured to guide the door wing along a sidewall of the furniture carcass.

Moreover, the invention relates to an item of furniture comprising a furniture carcass, a door wing movable relative to the furniture carcass, and a guide system of the type to be described.

WO 2018/129572 A1 discloses a guide system for moving two hingedly interconnected door wings between a first position, in which the door wings are aligned substantially coplanar to one another, and a second position, in which the door wings are aligned substantially parallel to one another. In the second (parallel) position, the door wings can be countersunk into a lateral insertion compartment of the furniture carcass. When the door wings are moved from the countersunk position within the insertion compartment into a position outside the insertion compartment, it may occur that the door wings, in a transition region of guide rails extending transversely to one another, are tilted too early in relation to a sidewall of the furniture carcass due to the exertion of manual force. In an extreme case, this may lead that the door wings can get jammed with the furniture carcass and a continued movement of the furniture wing is no longer possible. Only after the door wings have been moved back, the jamming can be released. Due to this jamming, the door wings and the fitting components of the guide system are subjected to strong mechanical stresses.

SUMMARY OF THE INVENTION

It is an object of the present invention to propose a guide system of the type mentioned in the introductory part, thereby avoiding the above-discussed drawbacks.

According to the invention, the guide system includes at least one deflection element for supporting the at least one door wing at least in a transition region between the first guide and the second guide. By the at least one deflection element, a collision between the furniture carcass, in particular the sidewall of the furniture carcass, and/or a cover arranged thereon and the at least one door wing can be prevented in the transition region.

In other words, a deflection element is arranged in the transition region between the first and second guide, and the at least one deflection element is configured to prevent a too early pivoting movement of the at least one door wing in the transition region. Thereby, it can be ensured that the door wing, starting from a position in which the door wing is aligned substantially parallel to the sidewall of the furniture carcass, can only be pivoted in relation to the sidewall after having been fully extended and, subsequently, can be moved into a position in which the furniture carcass can be covered.

According to an embodiment, the at least one deflection element is movably, preferably pivotally, supported. The deflection element can be configured to be rotationally symmetrical, for example as a rotatable roller.

The at least one deflection element can be arranged on a mounting portion connected to the sidewall. Preferably, a position of the at least one deflection element relative to the mounting portion can be adjusted by at least one adjustment device. By the adjustment device, a position of the deflection element can be adjusted such that the at least one door wing can be glidingly supported on the deflection element, and a jamming between the deflection element and the door wing can be prevented.

The deflection element may be arranged on the furniture carcass, in particular on the sidewall of the furniture carcass, on a mounting portion configured to be connected to the furniture carcass, on the at least one door wing, or on a cover movably-supported on the furniture carcass. The cover is configured to at least partially cover a gap formed between the sidewall of the furniture carcass and the at least one door wing. Preferably, the cover is pivotally supported about an axis extending vertically in a mounted position.

The deflection element can have at least one convex-shaped deflection contour for glidingly supporting the door wing. In this way, the start, the course, and the end of a pivoting movement of the door wing in the transition region can be controlled in an improved manner.

BRIEF DESCRIPTION OF THE DRAWINGS

Further details and advantages of the present invention result from the following description of figures.

DETAILED DESCRIPTION OF THE INVENTION

Figure 1A:
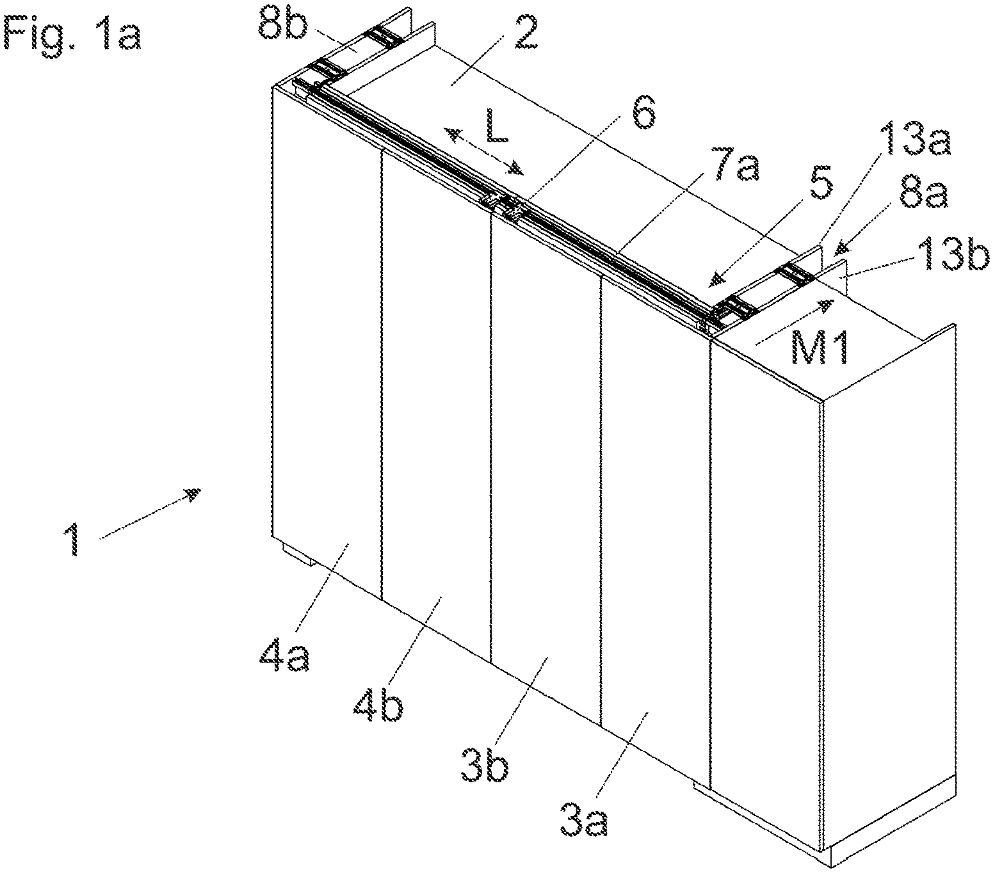
FIG. 1*a*, 1*b* are perspective views of an item of furniture comprising a furniture carcass and door wings movable relative thereto.

FIG. 1*a* shows a perspective view of an item of furniture 1 comprising a furniture carcass 2 and door wings 3*a*, 3*b*; 4*a*, 4*b* movable relative to the furniture carcass 2. The door wings 3*a*, 3*b*; 4*a*, 4*b* are movably supported by a guide system 5 between a first position, in which the door wings 3*a*, 3*b*; 4*a*, 4*b* are aligned substantially coplanar to one another, and a second position, in which the door wings 3*a*, 3*b*; 4*a*, 4*b* are aligned substantially parallel to one another. In the second (parallel) position, the door wings 3*a*, 3*b* can be inserted in a first direction of movement (M1) into a lateral receiving compartment 8*a* of the furniture carcass 2, whereas the two other door wings 4*a*, 4*b*, in a parallel position to one another, can be inserted into a further receiving compartment 8*b*. The functionality will be explained in the following with the aid of the door wings 3*a* and 3*b*, and the same explanations apply to the other door wings 4*a*, 4*b*. The guide system 5 includes a first guide 7*a* having a longitudinal direction (L), and a guide carriage 6 configured to be connected to the second door wing 3*b* is displaceably supported along the first guide 7*a*.

Figure 1B:
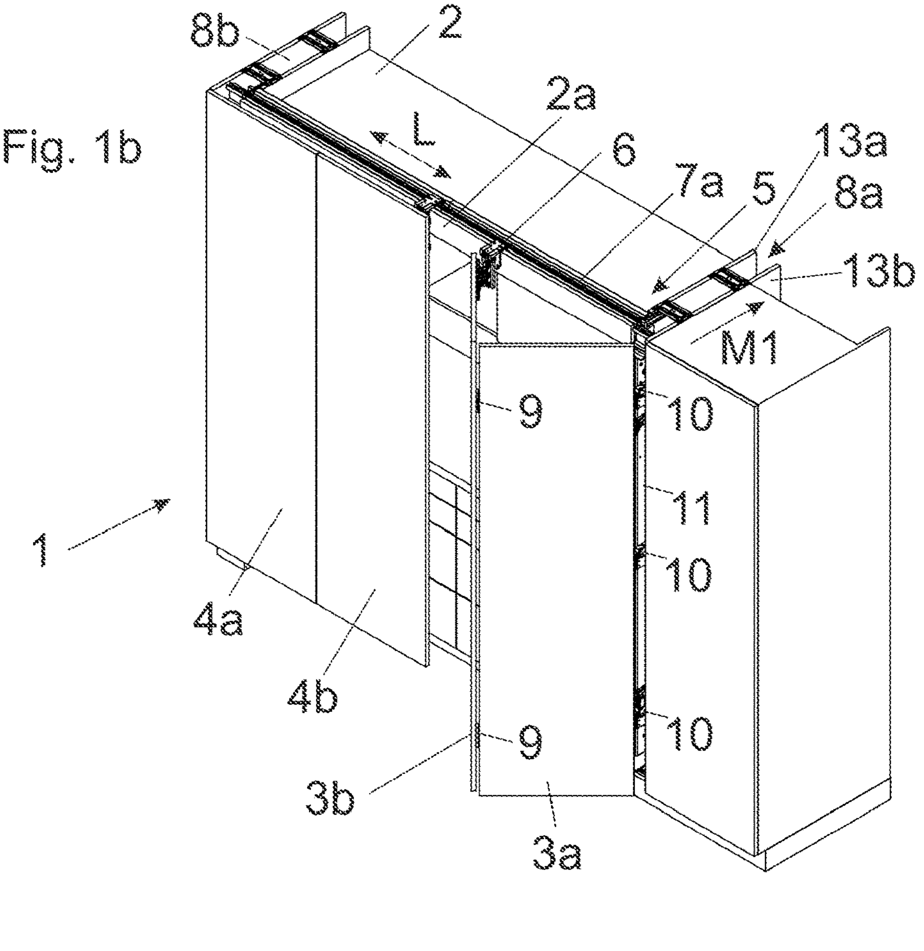

FIG. 1*b* shows the item of furniture 1 in which the door wings 4*a*, 3*b* have been moved from the coplanar position shown in FIG. 1*a* into an angled position to one another. The first guide 7*a* is configured to move the door wings 3*a*, 3*b* along a front face 2*a* of the furniture carcass 2. The first door wing 3*a* is supported on carrier 11 via two or more furniture hinges 10. The carrier 11 can be inserted into the receiving compartment 8*a* in the first direction of movement (M1), that is to say in a direction of the depth of the furniture carcass 2. In the shown figure, the carrier 11 is located in a transfer position in which the carrier 11 adjoins the first guide 7*a* in the longitudinal direction (L) so as to transfer the guide carriage 6 to and from between the first guide 7*a* and the carrier 11. In the shown transfer position, the carrier 11 is releasably locked to the first guide 7*a*, and the locking between the first guide 7*a* and the carrier 11 can be released by an entry of the guide carriage 6 in or onto the carrier 11. The carrier 11 is in the form of a longitudinal column, and a length of which corresponds to at least half of a height of the door wings 3*a*, 3*b*. The two door wings 3*a*, 3*b* are hingedly connected to one another about a vertically extending axis via at least one hinge fitting 9. The second door wing 3*b* is displaceably supported along the first guide 7*a* by the guide carriage 6.

Figure 2A:
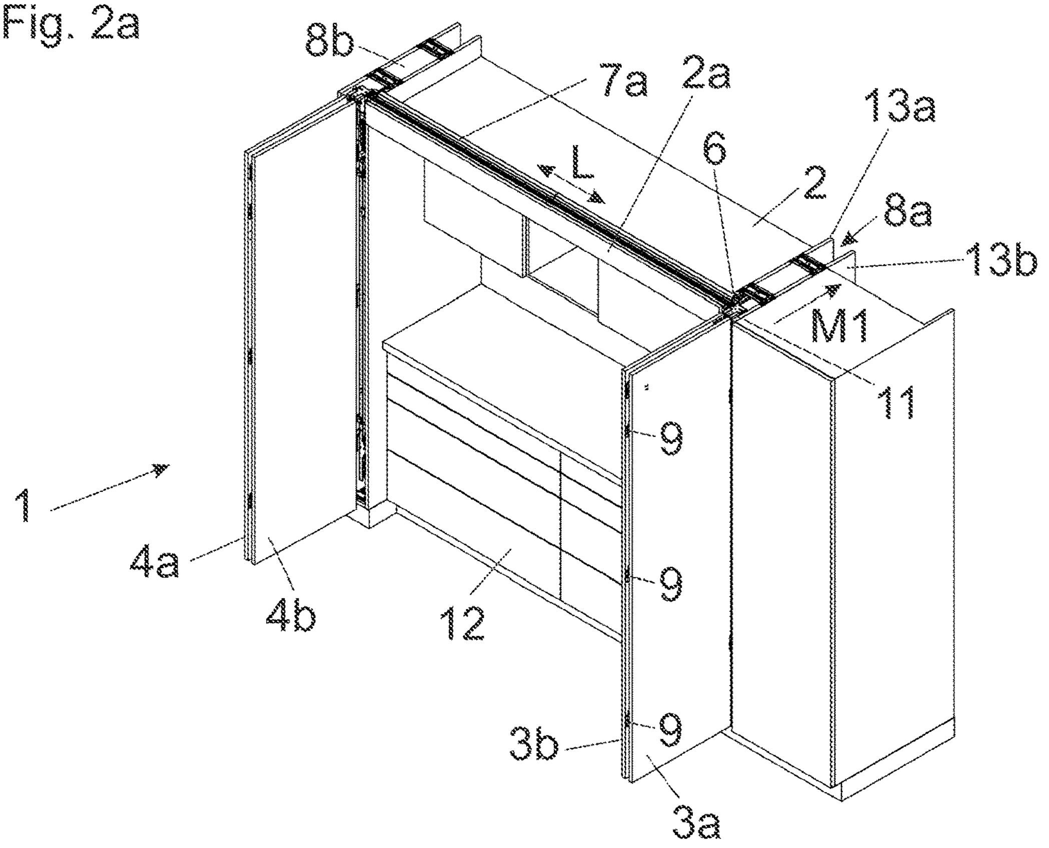
FIG. 2*a*, 2*b* show the item of furniture according to FIGS. 1*a*, 1*b* with the door wings in further positions to one another.

FIG. 2*a* shows the item of furniture 1 with the door wings 3*a* and 3*b* which are now aligned parallel to one another. The carrier 11 has been unlocked from the first guide 7 by an entry of the guide carriage 6. As a result, the carrier 11 (jointly with the guide carriage 6 and the door wings 3*a*, 3*b*) can be inserted into the receiving compartment 8*a* along a second guide 7*b* (see FIG. 3), the second guide 7*b* extending transversely to the longitudinal direction (L) of the first guide 7*a*. Preferably, it can provided that the first guide 7*a* and/or the second guide 7*b* is or are formed on a guide rail.

Figure 2B:
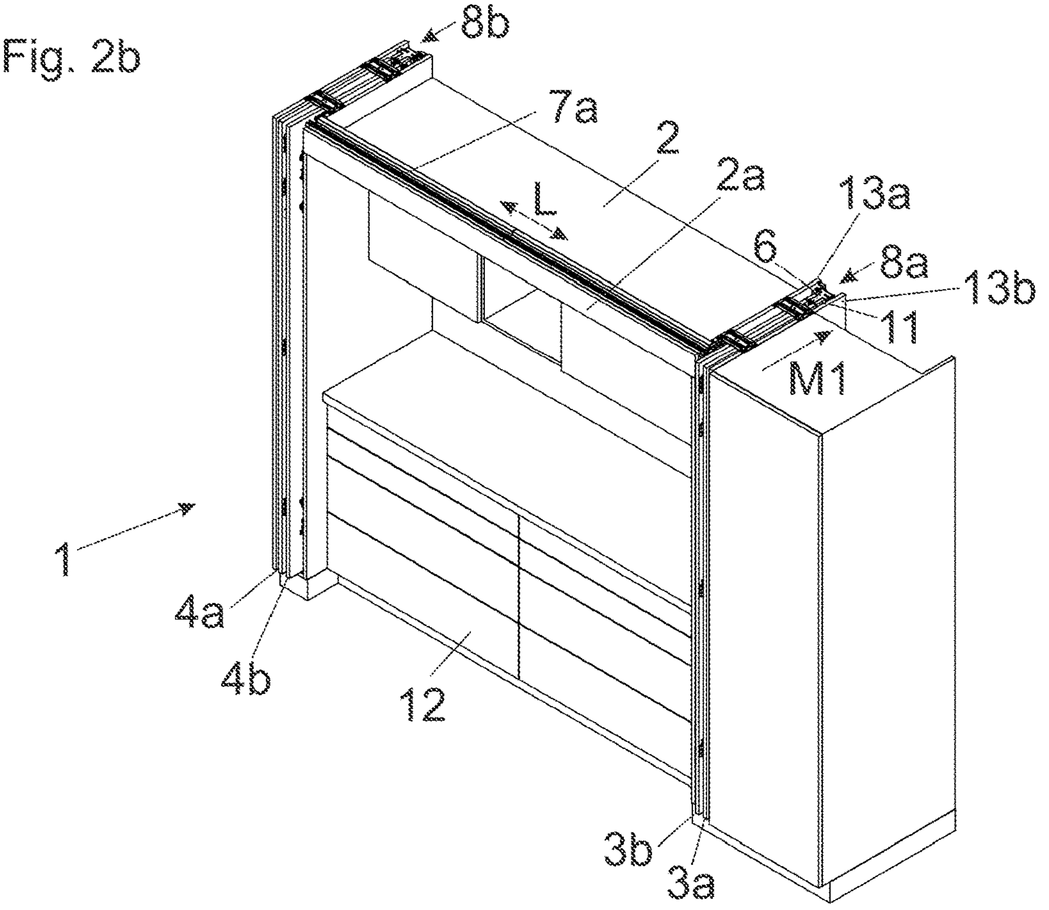

FIG. 2*b* shows the item of furniture 1 with the door wings 3*a*, 3*b* which are now located in a fully inserted condition within the receiving compartment 8*a*. The door wings 3*a*, 3*b* are thus movably supported by the guide system 5 between a first position according to FIG. 1*a*, in which the door wings 3*a*, 3*b* are aligned substantially coplanar to one another, and a second position according to FIG. 2*b*, in which the door wings 3*a*, 3*b* are aligned substantially parallel to one another and can be accommodated within the receiving compartment 8*a*. In this way, for example, a kitchen 12 as shown in FIG. 2*a*, 2*b* can be entirely covered, so as to visually separate the kitchen 12 from a remaining area of a living room. In the shown embodiment, the receiving compartment 8*a* is formed by a sidewall 13*a* and a partition wall 13*b* spaced from the sidewall 13*a* in a parallel relationship. The door wings 3*a*, 3*b*, in a parallel position to one another, can be inserted in the first direction of movement (M1) between the sidewall 13*a* and the partition wall 13*b*.

Figure 3A:
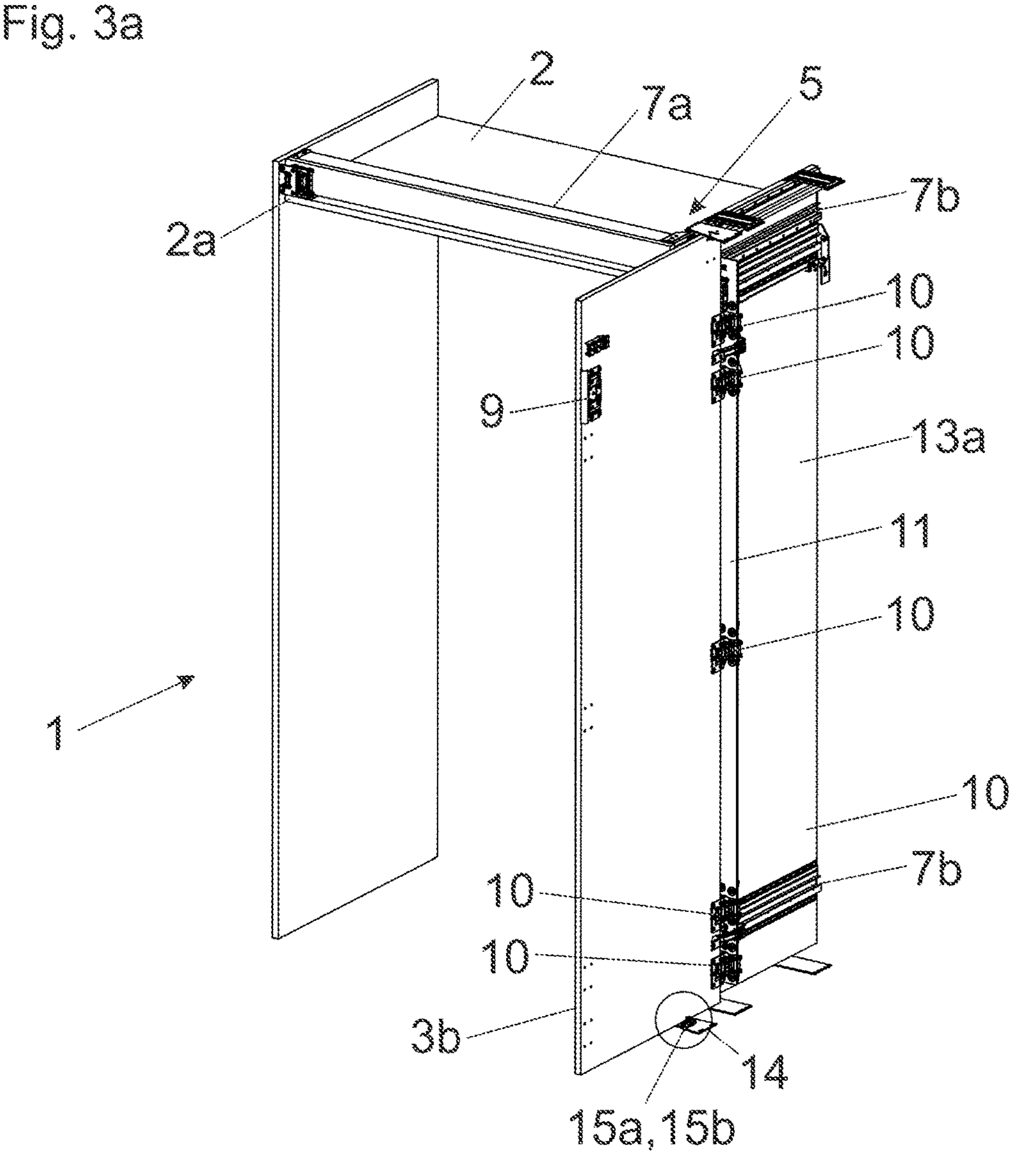
FIG. 3*a*, 3*b* are a perspective view of the item of furniture and an enlarged detail view thereof.

FIG. 3*a* shows a perspective view of the item of furniture 1 with the furniture carcass 2, and the first door wing 3*a* is hidden for the sake of improved overview. The first guide 7*a* is arranged on the furniture carcass 2, and the door wings 3*a*, 3*b* can be guided along the front face 2*a* of the furniture carcass 2 by the first guide 7*a*. At least one second guide 7*b* is arranged on the sidewall 13*a* of the furniture carcass 2, and the door wings 3*a*, 3*b* can be guided along the sidewall 13*a* of the furniture carcass 2 by the at least one second guide 7*b*. In the shown embodiment, two second guide rails 7*b* are provided on the sidewall 13*a*, the second guide rails 7*b* being mutually spaced from one another in a height direction. The carrier 11 (jointly with the door wings 3*a*, 3*b*) is movable along the second guide rails 7*b*. On the displaceable carrier 11, two or more furniture hinges 10 are provided for pivotally supporting the first door wing 3*a*, the furniture hinges 10 being mutually spaced from one another. The second door wing 3*b* is hingedly connected to the first door wing 3*a* via at least one hinge fitting 9.

The guide system 5 includes at least one deflection element 15*a*, 15*b* for supporting the at least one door wing 3*a*, 3*b* in a transition region located between the first guide 7*a* and the second guide 7*b*. By the at least one deflection element 15*a*, 15*b*, a collision between the furniture carcass 2, in particular the sidewall 13*a* of the furniture carcass 2, and the at least one door wing 3*a*, 3*b* can be prevented in the transition region. In the shown embodiment, the at least one deflection element 15*a*, 15*b* is fixed to the sidewall 13*a* in a region adjacent to the bottom and in a front region of the sidewall 13*a*.

Figure 3B:
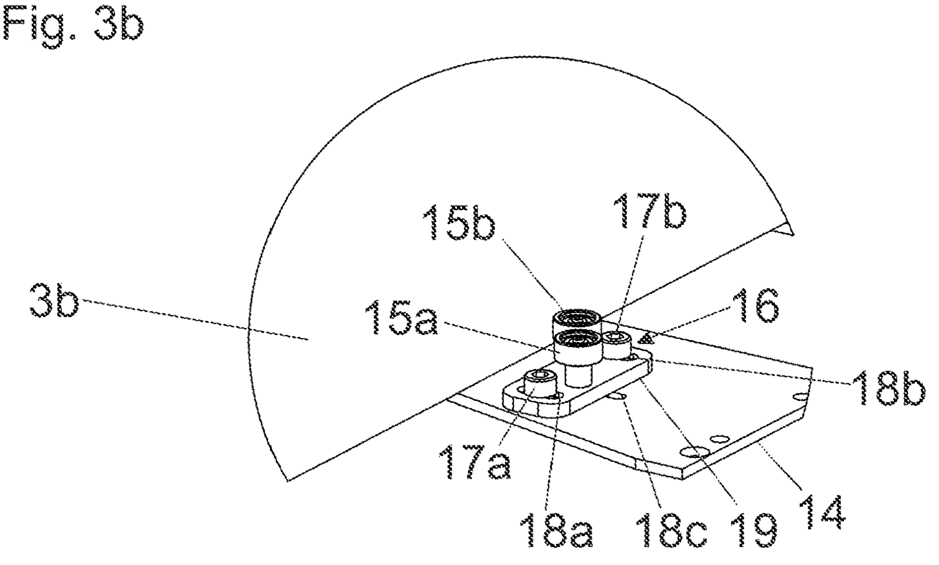

FIG. 3*b* shows the encircled region of FIG. 3*a* in an enlarged view. Two rotationally symmetrical deflection elements 15*a*, 15*b* can be seen, preferably in the form of rotatable rollers. An inner side of the first door wing 3*a* can be rolled along the first deflection element 15*a*, and an inner side of the second door wing 3*b* can be rolled along the second deflection element 15*b*. The deflection elements 15*a*, 15*b* are fixed to the sidewall 13*a* via a mounting portion 14, the mounting portion 14 reaching under the two door wings 3*a*, 3*b*. The deflection elements 15*a*, 15*b* are pivotally supported on a base member 19, and a position of the deflection elements 15*a*, 15*b* relative to the mounting portion 14 can be adjusted by at least one adjustment device 16.

In the shown embodiment, the adjustment device 16 includes two clamping screws 17*a*, 17*b*. The base member 19, in a released condition of the clamping screws 17*a*, 17*b*, can be adjusted relative to the mounting portion 14 by at least one linear guide 18*a*, 18*b*, 18*c*. The base member 19, in a tightened position of the clamping screws 17*a*, 17, is fixed relative to the mounting portion 14. When the door wings 3*a*, 3*b* are extended from the lateral receiving compartment 8*a* (which is formed by the sidewall 13*a* and the partition wall 13*b*), the first door wing 3*a* can be spaced with a predetermined distance from the sidewall 13*a* due to bearing against the first deflection element 15*a*. Because of the fact that the second door wing 3*b* is hingedly connected to the first door wing 3*a* via the hinge fitting 9 on the one hand, and is hingedly connected to the guide carriage 6 on the other hand, the second door wing 3*b* can be also spaced from the sidewall 13*a* when extended from the receiving compartment 8*a*. A pivoting movement of the furniture hinges 10 for supporting the first door wing 3*a* is only possible when the door wings 3*a*, 3*b* have entirely been moved out from the receiving compartment 8*a* of the furniture carcass 2.

Figure 4A:
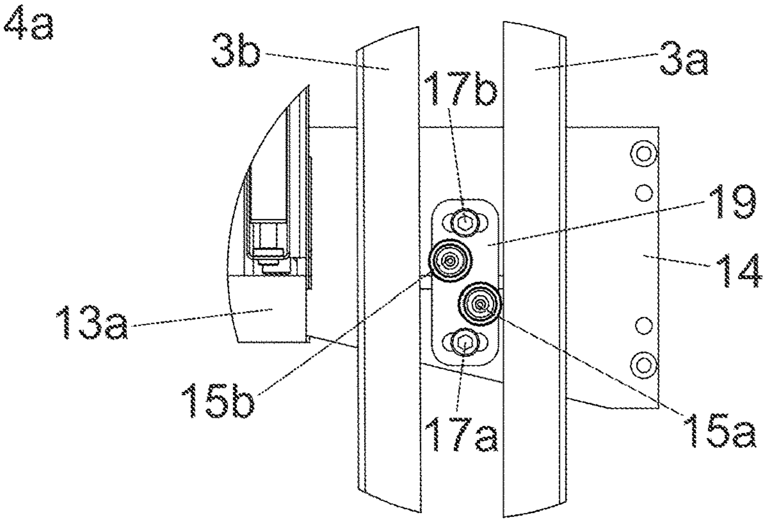
FIG. 4*a*-4*c* show the extending movement of the door wings from the lateral receiving compartment in temporal sequences.
Figure 4B:
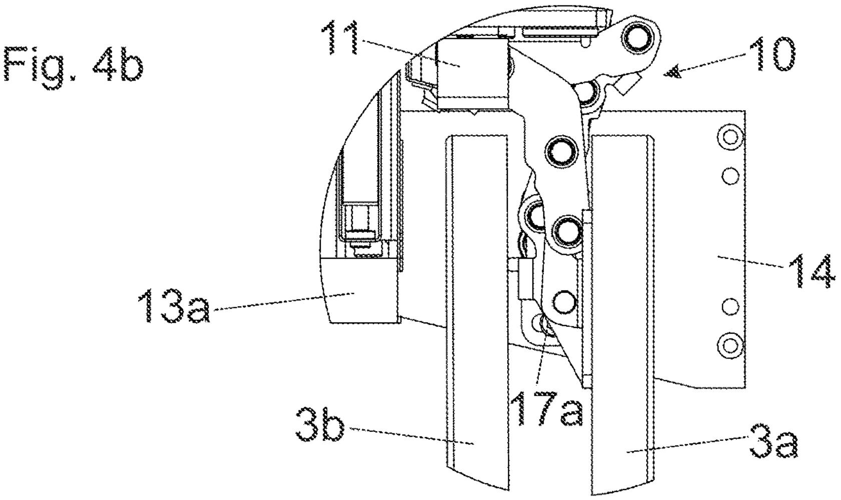
Figure 4C:
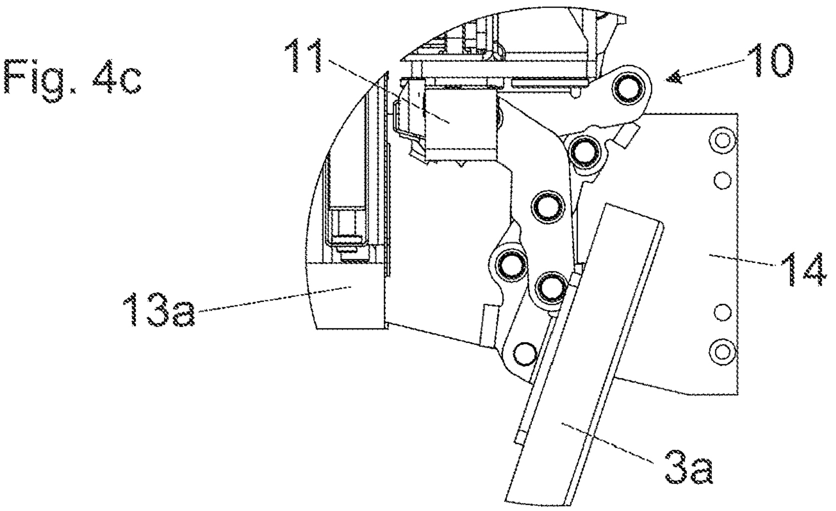

FIG. 4*a*-4*c* show the extending movement of the door wings 3*a*, 3*b* from the lateral receiving compartment 8*a* in a top view and in temporal sequences. In FIG. 4*a*, the door wings 3*a*, 3*b* are located in a parallel position to one another, in which the door wings 3*a*, 3*b* are received within the lateral receiving compartment 8*a*. The deflection elements 15*a*, 15*b* are thereby located between the two door wings 3*a*, 3*b*. To be seen are the clamping screws 17*a*, 17*b* of the adjustment device 16, the adjustment device 16 being configured to adjust a position of the deflection elements 15*a*, 15*b* in relation to the door wings 3*a*, 3*b*.

In FIG. 4*b*, the carrier 11, on which the furniture hinges 10 for movably supporting the first door wing 3*a* are arranged, is located close to its extended position in relation to the second guide 7*b* (FIG. 3*a*). However, by the deflection elements 15*a*, 15*b*, the door wings 3*a*, 3*b* are further held in a spaced position in relation to the sidewall 13*a*, and a pivoting movement of the furniture hinges 10 can be prevented because of the first door wing 3*a* bearing against the deflection element 15*a*. Only after the door wings 3*a*, 3*b* have entirely been moved out from the lateral receiving compartment 8*a*, a pivoting movement of the first door wing 3*a* about a vertically extending axis in the mounted position is possible.

Figure 5A:
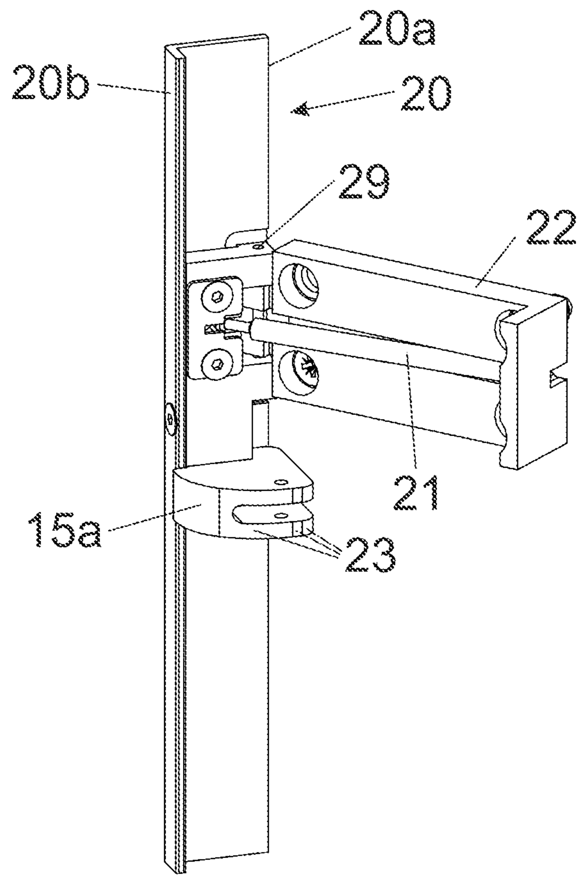
FIG. 5*a*, 5*b* show a deflection element arranged on a cover and a furniture hinge for pivotally supporting a door wing in perspective views.

FIG. 5*a* shows a further embodiment of the invention, in which at least one deflection element 15*a* is arranged on a cover 20 configured to be fixed to the furniture carcass 2. That deflection element 15*a* can be provided as an alternative or in addition to the deflection elements 15*a*, 15*b* shown in FIGS. 3*a*, 3*b*, 4*a*-4*c*.

In FIG. 5*a*, the deflection element 15*a*, jointly with the cover 20, is pivotally supported about a pivoting axis 29 which preferably extends vertically in a mounted position. The cover 20 is configured to cover a gap 31 (FIG. 6*a*) formed between the furniture carcass 2, in particular the sidewall 13*a* of the furniture carcass 2, and the door wing 3*a*. This is, in particular, the case when the door wing 3*a* is located in a fully inserted position within the receiving compartment 8*a*. The cover 20 includes a first limb 20*a* and a second limb 20*b* protruding transversely, preferably substantially at a right angle, from the first limb 20*a*. Preferably, it can be provided that the first limb 20*a* and the second limb 20*b* of the cover 20 have different lengths.

The cover 20 is pivotally connected to a fitting portion 22 configured to be fixed to the furniture carcass 2, in particular to the sidewall 13*a*. The cover 20 is pressurized by a force of a force storage member 21 (in particular a tension spring) in a direction in which the gap 31 can be covered (thus permanently in a direction of a covering position). The deflection element 15*a* has a, preferably convex-shaped, deflection contour 23 configured to co-operate with the door wing 3*a*. In this case, the deflection element 15*a* can also be configured to prevent a collision between the door wing 3*a* and the furniture carcass 2 and/or the cover 20 upon extending the door wing 3*a* from the receiving compartment 8*a*.

Figure 5B:
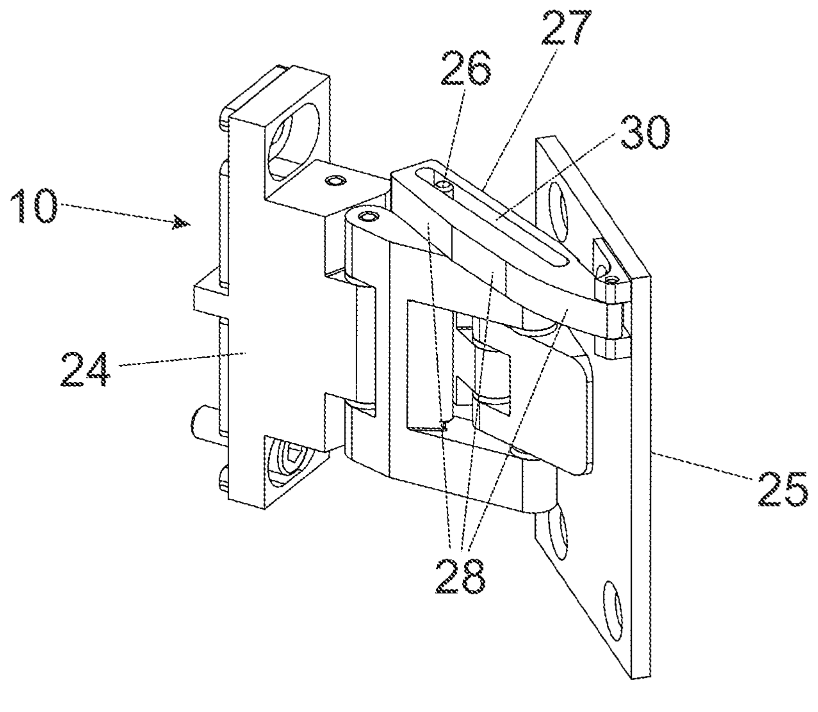

FIG. 5*b* shows a perspective view of an exemplary furniture hinge 10 for pivotally supporting the door wing 3*a* on the carrier 11. The furniture hinge 10 includes a first fitting portion 24 configured to be fixed to the carrier 11 and a second fitting portion 25 configured to be fixed to the door wing 3*a*. The furniture hinge 10 can be configured as a multi-joint hinge having at least five, preferably at least seven, hinge axes. The furniture hinge 10 includes a movably-supported control element 27, preferably in the form of a hinge lever, with a guide 30, preferably in the form of an elongated hole. A pin 26 of the furniture hinge 10 is displaceably guided in the guide 30 of the control element 27. In this way, a movement of the control element 27 can be coupled to a movement of the furniture hinge 10. The control element 27 is provided with a control curve 28 co-operating with the cover 20, whereby the cover 20 can be moved about the pivoting axis 29 in a controlled manner in terms of time and kinematics.

Figure 6A:
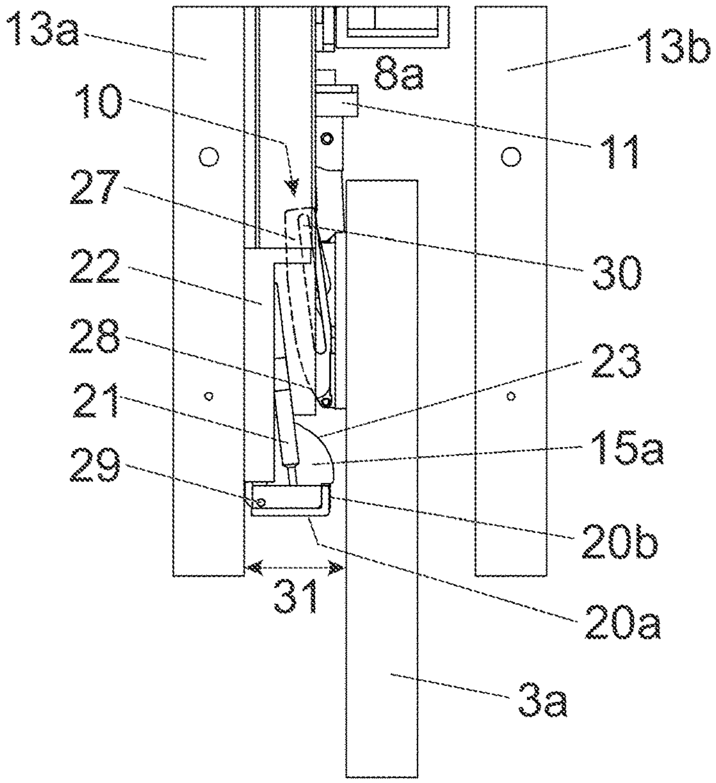
FIG. 6*a*, 6*b* show an extending movement of the door wing from the receiving compartment in temporally subsequent steps.

FIG. 6*a* shows a top view of the door wing 3*a* arranged between the sidewall 13*a* and the partition wall 13*b*, thus the door wing 3*a* being partially located within the receiving compartment 8*a* of the furniture carcass 2. The cover 20 with the limbs 20*a*, 20*b* extending at a right angle to one another is fixed to the sidewall 13*a* of the furniture carcass 2 via the fitting portion 22. The cover 20 is pivotally supported about the pivoting axis 29 and is configured to be engaged with the control curve 28 of the control element 27 of the furniture hinge 10 upon an extending movement of the door wing 3*a*. By the cover 20, in particular by the first limb 20*a*, a gap 31 formed between the sidewall 13*a* and the door wing 3*a* can be at least partially covered. In a position in which the gap 31 is covered, the first limb 20*a* of the cover 20 is aligned substantially perpendicular to the sidewall 13*a*. The furniture hinge 10 with the control element 27 is arranged on the carrier 11, and the carrier 11 is displaceable along the second guide 7*b*. The deflection element 15*a* with the deflection contour 23 is spaced from the control element 27 in the height direction. Therefore, the deflection element 15*a* is not contacted by the control element 27, but rather by the door wing 3*a*.

Figure 6B:
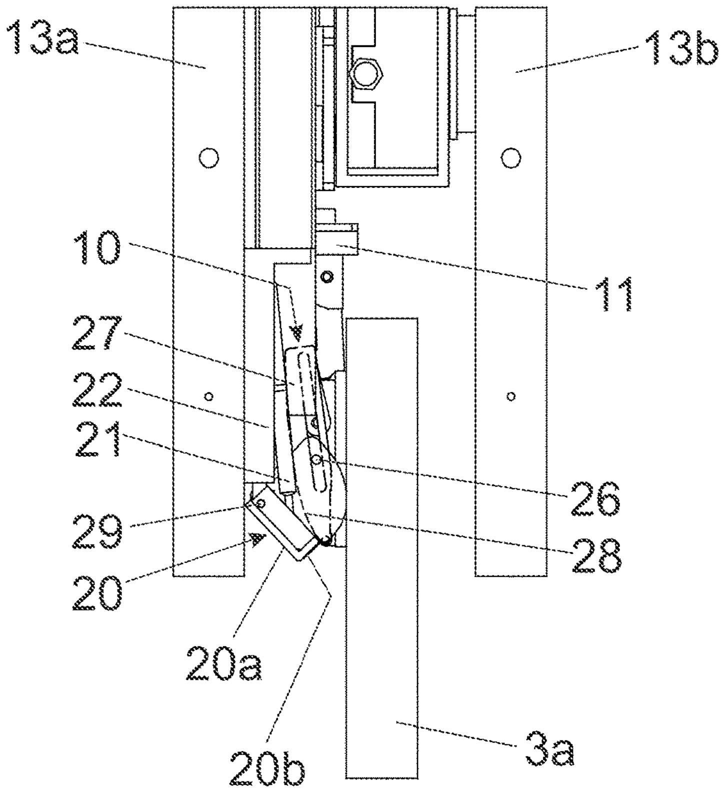

When now the door wing 3*a* is pulled out from the receiving compartment 8*a*, the cover 20, in the present case the second limb 20*b* of the cover 20, can be contacted by the control curve 28 of the control element 27. In this way, the cover 20 can be pivoted about the pivoting axis 29 by the control element 27 of the furniture hinge 10, as shown in FIG. 6*b*. Due to the pivoting movement of the cover 20, the deflection element 15*a* is also pivoted about the pivoting axis 29. The deflection contour 23 of the deflection element 15*a* contacts the door wing 3*a* and, therefore, a collision between the door wing 3*a* and the sidewall 13*a* of the furniture carcass 2 can be prevented.

Figure 7A:
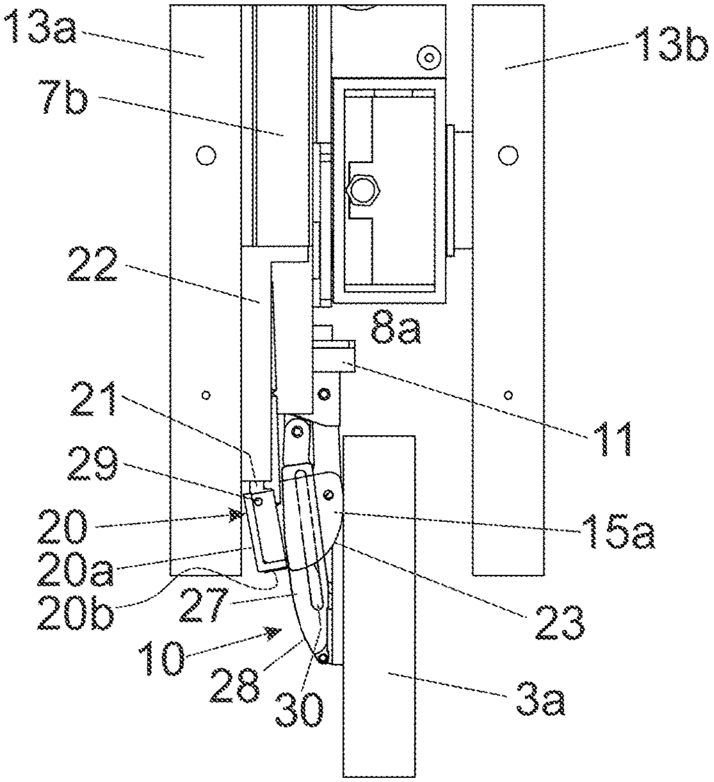
FIG. 7*a*, 7*b* show further positions of the door wing upon extending the door wing from the receiving compartment.

FIG. 7*a* shows a continued extending movement of the door wing 3*a* from the receiving compartment 8*a*. The door wing 3*a* can be glidingly supported on the deflection contour 23 of the deflection element 15*a*, and a collision between the door wing 3*a* and the sidewall 13*a* and/or the cover 20 can be prevented. The control element 27 with the control curve 28, on the contrary, can be glidingly supported on the cover 20, whereby the cover 20, jointly with the deflection element 15*a*, can be pivoted about the pivoting axis 29.

Figure 7B:
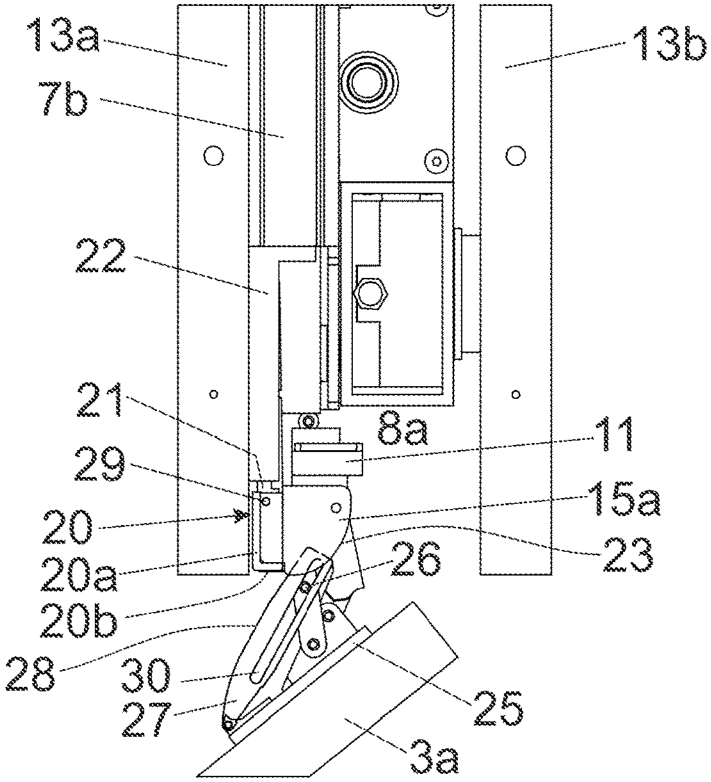

FIG. 7*b* shows a further position of the door wing 3*a* which can only be pivoted relative to the sidewall 13*a* after the door wing 8*a* has entirely been extended from the receiving compartment 8*a*. In this position, the first limb 20*a* of the cover 20 is aligned substantially parallel to the sidewall 13*a*. In a position subsequent to FIG. 7*b*, the door wing 3*a* can be moved in a position in which the furniture carcass 2 can be covered (FIG. 1*a*). In order to prevent an inadvertent return movement of the cover 20, caused by a force of the force storage member 21, it can be provided that the cover 20, in particular the first limb 20*a* of the cover 20, from the position shown in FIG. 6*b* until reaching the position in which the door wing 3*a* covers the furniture carcass 2, is permanently supported on the control curve 28 of the control element 27 of the furniture hinge 10.

The invention claimed is:

1. A guide system for guiding at least one door wing relative to a furniture carcass, the guide system comprising:

a first guide configured to guide the at least one door wing along a front face of the furniture carcass;

a second guide extending transversely to the first guide, the second guide being configured to guide the at least one door wing along a sidewall of the furniture carcass; and at least one deflection element for supporting the at least one door wing at least in a transition region between the first and the second guide, wherein the at least one deflection element is configured to bear directly against the at least one door wing so as to prevent a collision between the at least one door wing and the furniture carcass or a cover arranged on the furniture carcass in the transition region, wherein the at least one deflection element is configured to be rotationally symmetrical.

2. The guide system according to claim 1, wherein the at least one deflection element is movably supported.

3. The guide system according to claim 2, wherein the at least one deflection element is pivotally supported.

4. The guide system according to claim 1, wherein the at least one deflection element is arranged on a mounting portion connected to the sidewall.

5. The guide system according to claim 1, wherein the at least one deflection element is arranged on a cover configured to be fixed to the furniture carcass, and wherein the at least one deflection element, jointly with the cover in a mounted position, is pivotally supported about a vertically extending pivoting axis.

6. The guide system according to claim 1, wherein the at least one deflection element has at least one convex-shaped deflection contour for glidingly supporting the at least one door wing.

7. The guide system according to claim 1, wherein the at least one deflection element includes at least two deflection elements, the at least two deflection elements being mutually spaced from one another in a height direction of the at least one door wing.

8. The guide system according to claim 1, wherein at least one of the first guide and the second guide is formed on a guide rail.

9. The guide system according to claim 1, wherein the first guide and the second guide are formed together to have an integral one-piece configuration, or are configured as components separate from one another.

10. The guide system according to claim 1, wherein the at least one door wing is pivotally supported on a carrier via at least one furniture hinge, the carrier being configured to be displaceably supported along the second guide.

11. An item of furniture comprising:

a furniture carcass;

at least one door wing movably-supported relative to the furniture carcass; and the guide system according to claim 1 for moving the at least one door wing relative to the furniture carcass.

12. The item of furniture according to claim 11, wherein the furniture carcass includes at least one lateral receiving compartment for receiving the at least one door wing, and wherein the at least one door wing is configured to be moved substantially parallel to the sidewall of the furniture carcass by the second guide.

13. The item of furniture according to claim 11, wherein the at least one door wing includes a first door wing and a second door wing which are movably-supported relative to the furniture carcass, wherein the first and second door wings are hingedly connected to one another via a vertically extending axis in a mounted position, wherein the first and second door wings are movable by the guide system between a first position, in which the first and second door wings are aligned substantially coplanar to one another, and a second position, in which the first and second door wings are aligned substantially parallel to one another.

14. The item of furniture according to claim 13, wherein the at least one deflection element includes a first deflection element which is configured to be engaged with the first door wing and a second deflection element which is configured to be engaged with the second door wing.

15. The guide system according to claim 1, wherein the at least one door wing is a folding-sliding-door, and wherein the at least one deflection element is configured to bear directly against the at least one door wing so as to prevent a collision between the at least one door wing and the sidewall of the furniture carcass or a cover arranged on the sidewall of the furniture carcass in the transition region.

16. The guide system according to claim 1, wherein the at least one deflection element is a rotatable roller.

17. A guide system for guiding at least one door wing relative to a furniture carcass, the guide system comprising:

a first guide configured to guide the at least one door wing along a front face of the furniture carcass;

a second guide extending transversely to the first guide, the second guide being configured to guide the at least one door wing along a sidewall of the furniture carcass; and at least one deflection element for supporting the at least one door wing at least in a transition region between the first and the second guide, wherein the at least one deflection element is configured to bear directly against the at least one door wing so as to prevent a collision between the at least one door wing and the furniture carcass or a cover arranged on the furniture carcass in the transition region, wherein the at least one deflection element, in a mounted position, is arranged on a cover configured to be fixed to the furniture carcass, and the cover is configured to at least partially cover a gap formed between the sidewall of the furniture carcass and the at least one door wing.

18. A guide system for guiding at least one door wing relative to a furniture carcass, the guide system comprising:

a first guide configured to guide the at least one door wing along a front face of the furniture carcass;

a second guide extending transversely to the first guide, the second guide being configured to guide the at least one door wing along a sidewall of the furniture carcass; and at least one deflection element for supporting the at least one door wing at least in a transition region between the first and the second guide, wherein the at least one deflection element is configured to bear directly against the at least one door wing so as to prevent a collision between the at least one door wing and the furniture carcass or a cover arranged on the furniture carcass in the transition region, wherein the at least one deflection element is arranged on a mounting portion connected to the sidewall, and wherein the guide system further comprises at least one adjustment device configured to adjust a position of the at least one deflection element relative to the mounting portion.

* * * * *